Nov. 24, 1964

P. A. ALDINGER 3,158,000

METER

Filed May 13, 1963

INVENTOR.
PAUL A. ALDINGER

BY Arthur H. Swanson

ATTORNEY.

Nov. 24, 1964 P. A. ALDINGER 3,158,000
METER
Filed May 13, 1963 2 Sheets-Sheet 2

INVENTOR.
PAUL A. ALDINGER
BY
ATTORNEY.

United States Patent Office 3,158,000
Patented Nov. 24, 1964

3,158,000
METER
Paul A. Aldinger, Warminster, Pa., assignor to Honeywell Inc., a corporation of Delaware
Filed May 13, 1963, Ser. No. 279,864
3 Claims. (Cl. 60—54.5)

This invention relates to means for indicating, recording, and/or controlling in response to a pressure, more specifically, in response to the difference between two pressures.

Devices such as this have many uses, particularly for measuring flow. In order that the device be as sensitive as possible, i.e., as responsive to small differences in pressure, it is necessary that the movable element be light in weight and readily movable. A common form of such a movable or sensing element is one or more thin-walled, metallic bellows. Such delicate structures must be protected against overload. In order to provide this protection against overload, it is known to employ one or more of these movable or sensing elements mounted on a rigid case in such a way as to define one or more closed chambers. A substantially incompressible liquid is placed in this closed chamber or chambers. A pair of valves are arranged so that, in the case of an excessive pressure applied to the movable or sensing element, one of the valves closes by seating against a part of the rigid case. This traps liquid in the interior of that movable or sensing element which is exposed to the excessive pressure. Since this liquid is substantially incompressible and since the valve seats against a part of the rigid case, the sensitive movable element is protected against breakage due to overload by means of the liquid trapped within it.

It is an object of this invention to provide a pressure responsive device having means protecting it against small, unwanted, short-time changes in one or more of the pressures forming the input to the device while, at the same time, providing a device sensitive to significant changes in the input pressure. These means comprise a damping passage passing through a wall of a rigid case and located between the chamber to which a high pressure is applied to the device and to the sensing element, which element detects any difference between the pressures applied to the opposite sides thereof. A plate is located in the rigid case and forms part of the wall of the damping passage. A damping rod is located in said damping passage and has a portion extending through the wall of the case to the exterior thereof. This damping rod is manually operable from the exterior of the case to permit or to prevent flow of liquid through the damping passage.

It is also an object of this invention to provide a pressure responsive device having a pair of overload valves adapted to permit or to prevent flow of liquid through the damping passage. These overload valves are mounted in the case by means of a guide tube which extends in the direction of movement of the overload valves for a greater distance than the distance of travel of the overload valves. This guide tube supports the overload valves for accurate movement through their path of travel and permits manufacturing tolerances in the size and location of the sensing element, which actuates the overload valves. This guide tube also permits the path of travel of the overload valves to be slightly arcuate thereby allowing the overload valves to be connected to the free ends of a lever which rocks about a pivot.

A better understanding of the present invention may be had from the accompanying drawings of descriptive matter, in which.

Figure 1:
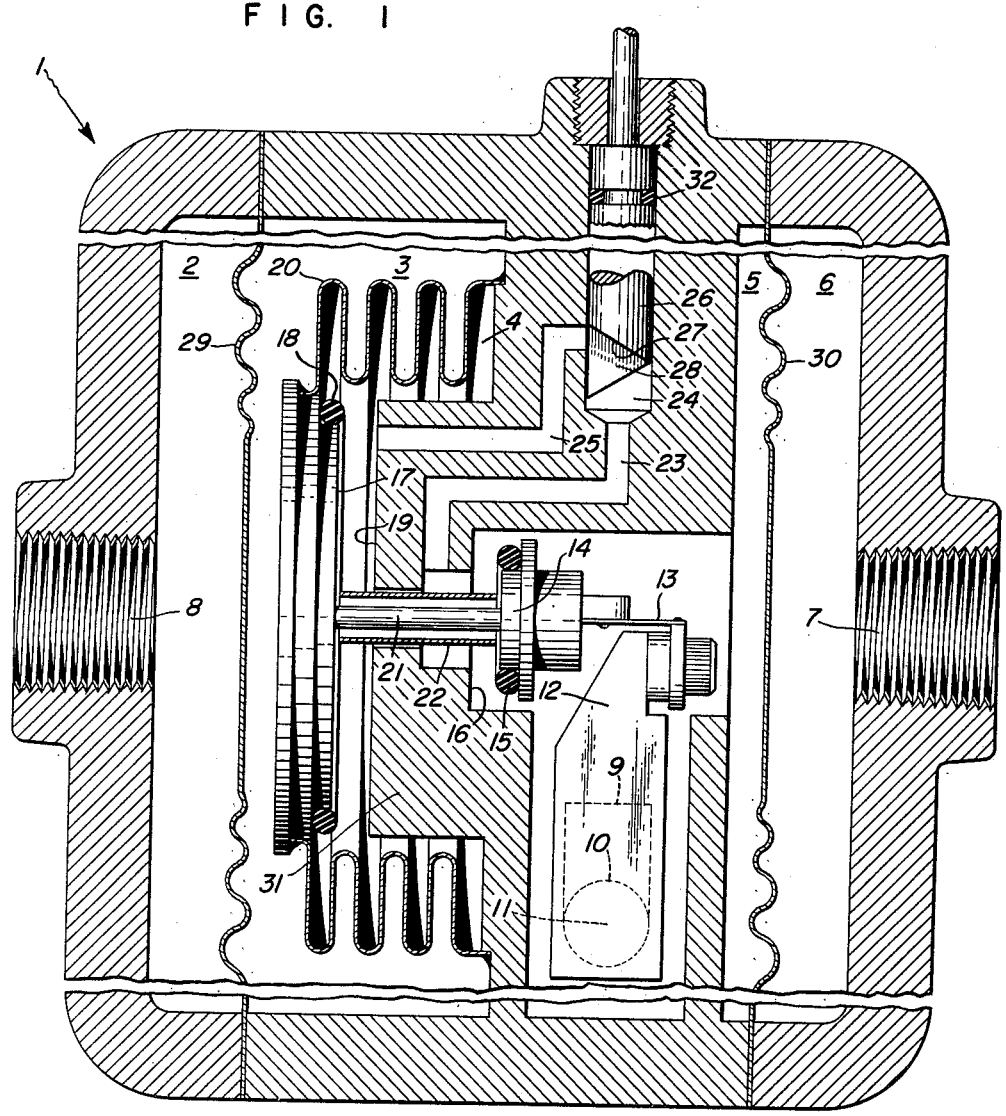
FIG. 1 is a longitudinal cross section in diagrammatic or schematic form with parts broken away to reduce the vertical dimension.

The device of this invention is disclosed in more or less diagrammatic form since many of the elements may be made in various different ways. A rigid case 1 has its interior divided into five chambers by means of partition 31, seals 29 and 30, and movable or sensing element 20. These chambers are: respectively; chamber 2, which is exposed to the low pressure to be measured; chamber 3, which is on the left of the movable or sensing element 20; chamber 4, which is in the center of the device on the right of the sensing element 20 and on the left of the partition 31; chamber 5, which is on the right of partition 31; and chamber 6, which is exposed to the high pressure which is to be measured.

Inlet port 7 admits high pressure through case 1 to chamber 6. Inlet port 8 admits low pressure to chamber 2 in case 1.

The output element of the device comprises a lever 9 mounted outside of case 1 and connected to the output end of a take-off 10, such as a torque tube. Torque tubes like this are well known and need not be described in detail herein. Torque tube 10 includes a thin-walled tube adapted to be twisted about an axis or pivot, indicated at 11. Within case 1 a torque arm 12 is connected to the inner arm of the torque tube 10. Torque arm 12 is adapted to be rocked about axis 11 by a flexible link or bellows strap 13, which is spot welded or otherwise attached at one end to the upper or movable end of torque arm 12 and which is attached by spot welding or the like at its other end to a valve assembly.

This valve assembly comprises a connecting rod 21 on which is mounted an overload valve 14 having a sealing element in the form of an O-ring 15 adapted to seat against a rigid valve seat 16 forming part of case 1. Connecting rod 21 also carries a second overload valve 17 having a second O-ring 18 and adapted to seat against a second valve seat 19 forming a part of rigid case 1.

Movable or sensing element 20 is shown as a thin-walled bellows fastended at its right end to case 1 and at its left end to the valve assembly so that movement of element 20 causes torque arm 12 to rock about its axis 11 and to actuate the output element 9 of the device. In the embodiment shown, the sensing element 20 has an effective diameter of approximately one and one quarter inches. The effective diameter of the seals 29 and 30 is approximately three and five-eighths inches. The ratio of these diameters is chosen depending upon the range of the differential pressure being measured. Since the travel of the seals 29 and 30 is small and the travel of the sensing element 20 is relatively large, it is a feature of this invention to use seals having a large effective diameter relative to the effective diameter of the sensing element. This provides more movement of the sensing element than of the seals.

Means are provided for damping out small, unwanted, short-time changes in pressure applied to the sensing element 20. These damping means comprise a damping passage 23 leading from chamber 5 to a second damping passage 24 whence a third damping passage 25 leads to chamber 4. In damping passage 24 is located a damping rod 26 which has at its inner end a pair of faces 27 and 28 of such shape that turning the damping rod 26 opens or closes the inner end of damping passage 25 and thereby permits or prevents the flow of liquid through the damping passage formed by the passages 25, 24 and 23. In other words, damping rod 26 is manually adjustable from the outside of case 1 so as to vary the amount of opening between chambers 4 and 5 and thereby vary the rate at which liquid can flow therebetween. Damping chamber 24 and damping rod 26 are sealed against the escape of liquid between them by one or more O-rings 32.

Figure 2:
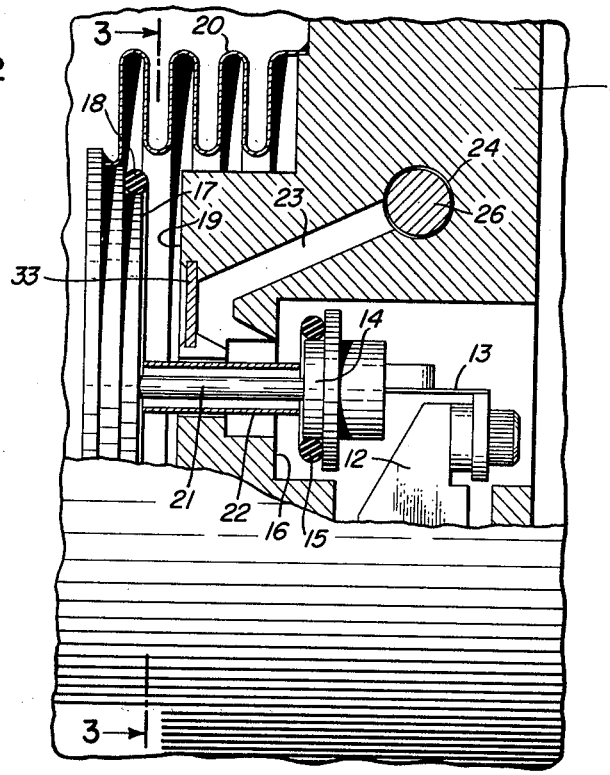
FIG. 2 is in part a longitudinal cross section at right angles to FIG. 1 and showing a portion of the damping passage in the overload valve as actually constructed.
Figure 3:
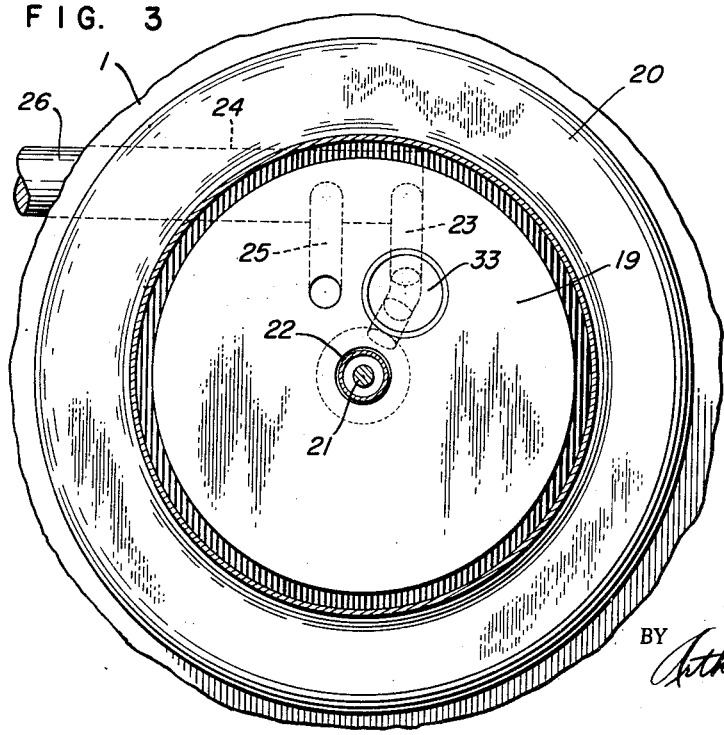
FIG. 3 is a transverse cross section on line 3—3 of FIG. 2.
Figure 4:
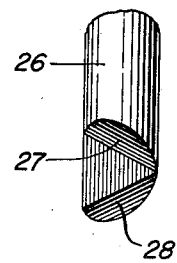
FIG. 4 is an elevation of one end of the damping rod.

Referring to FIGS. 2, 3, and 4 for a showing of the damping passage and of the overload valve as actually constructed, it is seen that the damping passage 25 terminates in a round hole in a face of partition 31 adjacent valve seat 19. Damping passage 25 cannot be seen in FIG. 2 because it lies behind damping passage 23. Damping passage 23 actually consists of two drilled holes each at an angle to the other to form a V shape and terminating in an opening in the face of partition 31 adjacent valve seat 19. This opening is closed by a sealing plate 33 which forms a wall of the damping passage 22.

The valve assembly, which is comprised of valve 14, rod 21, and valve 17, is connected at one end to the upper or free end of torque arm 12 by flexible link or bellows strap 13. Connecting rod 21 is attached at its opposite or left end to a free or movable portion of sensing element 20. The valve assembly therefor has a slight arcuate movement in its longitudinal travel in the passage in chamber in partition 31. Also it is desirable to allow for difference in sizes within a manufacturing tolerance of the sensing element 20 and of its attachment to the case 1. To permit this variation in the size of sensing element 20 and to permit the slight arcuate movement of the overload valve assembly, the assembly is associated with case 1 by means of a tubular bearing or guide tube 22. Guide tube 22 has a sliding fit in the opening in partition 31. Guide tube 22 is slightly shorter than the connecting rod 21 so that there is a clearance of a few thousandths of an inch at each end of tube 22. Guide tube 22 has a slight clearance between it and the connecting rod 21. Therefore, the incompressible liquid can pass from chamber 5 around one end of the guide tube 22, through the guide tube 22 between it and the connecting rod 21, and through the clearance between the opposite end of the guide tube 22 and the overload valve 17 to the chamber 4. This flow of liquid between rod 21 and tube 22 is small compared to the flow of liquid through the damping passage 23, 24 and 25, when the damping passage is open.

Means are provided to prevent the device from shifting upon changes in ambient temperature or static pressure applied to the device. These means are comprised by seals 29 and 30 which are of substantially equal area and substantially equal spring gradient and since the volume of chamber 3 is substantially equal to the volume of chambers 4 and 5, any change in ambient temperature or static pressure will simply cause equal changes in pressure in chambers 3, 4, and 5 and, therefore, will not change the pressure applied to the opposite sides of movable or sensing element 20. Therefore, there is no tendency for the device to move upon changes in ambient temperature or static pressure applied thereto. Output element 9, which is outside of case 1, may be used to actuate an indicator, a recorder, or a portion of a controller, either directly, or through an amplifying device. Such amplifying devices may comprise mechanical, electrical, or pneumatic amplifiers, which are well known in and of themselves. An example of such a device is found in United States Patent 2,800,725, patented October 8, 1957, to Booth, Du Bois and West.

The operation of this device is as follows. Assume that the pressure applied to the outer face of seal 29 is the same as the pressure applied to the outer face of seal 30. The device is therefore at rest and both overload valves 14 and 17 are out of engagement with cooperating valve seats 16 and 19, respectively.

Now assume the pressure applied to the outer face of seal 30 is to increase. This increase in pressure causes the movable portion of seal 30 to move. This increase in pressure in chamber 6 increases the pressure in chamber 5, in passages 23, 24, and 25, and, consequently, increases the pressure in chamber 4. This increase in pressure in chamber 4 causes a sensing element 20 to move to the left. This movement of sensing element 20 causes the upper end of torque arm 12 to rotate counter-clockwise about axis 11 and thereby cause the output element 9 to move counter-clockwise and actuate the indicator, recorder, or controller element attached to it.

If the force of the sensing element 20 is to be measured, the movement of sensing element 20 need only be exceedingly minute, of the order of a few thousandths of an inch, and is complete to the limit of movement before the corresponding overload valve closes. If the pressure applied to the outer face of seal 30 exceeds the pressure applied to the outer face of seal 29 to an excessive extent, sensing element 20 will cause the overload valve 14 to seat against its seat 16 and thereby trap liquid in the chambers 6 and 5. Since this liquid is substantially incompressible, seal 30 is supported by the liquid trapped behind it and withstands the pressure applied to it.

If the motion of the sensing element 20 is to be measured, this motion may be large relative to the motion of sensing element 20 when its force is being measured.

If the pressure applied to the outer face of seal 29 exceeds the pressure applied to the outer face of seal 30, sensing element moves in the opposite direction and causes take-off element 10 to actuate the output element 9 in the opposite direction. If this pressure becomes excessive, overload valve 17 is closed against the seat 19 thereby trapping liquid in chambers 3 and 4 and preventing damage to sensing element 20.

What is claimed is:

1. A device responsive to pressure which is protected against overload, including, a rigid, hollow case having a partition forming a part thereof, said partition having a perforation and a damping passage passing therethrough, a pair of seals mounted in said case, a sensing element having a stationary portion mounted on said case and a movable portion located in said case, said partition and said seals and said sensing element dividing the interior of said case into chambers each adapted to contain a substantially incompressible liquid therein, at least one overload valve movably mounted in the perforation in said partition and adapted to permit or to prevent flow of liquid through said damping passage, a damping rod located in said damping passage and having a portion extending through the wall of said case and manually operable from the exterior of said case to permit or to prevent flow of liquid through said damping passage, and a guide tube associated with said overload valve in the perforation in said partition and extending in the direction of movement of said overload valve for a greater distance than the distance of travel of said overload valve and sealing said perforation in said partition against the passage of liquid therethrough, and means connecting said sensing element to said overload valve to operate it.

2. In a pressure responsive device having a sensing element adapted to move in response to the difference in pressure applied to the opposite faces thereof, the improvement including, an overload protecting device, including, a rigid case in which said sensing element is mounted and having inlet ports through the wall thereof, a pair of seals each mounted in said case and each located between one of said inlet ports and a liquid-filled conduit formed in the interior of said case and located on opposite sides of said sensing element, a pair of overload valves each controlling the flow of liquid through a portion of said conduit and adapted to trap liquid in said conduit and thereby support said sensing element by said liquid against excessive pressure applied thereto, means for controlling the amount of liquid that can flow through that portion of the passage controlled by each said overload valves, and a guide tube associated with said overload valves in said case and extending in the direction of travel of said overload valves for a greater distance than the distance of travel of said overload valve.

3. A device responsive to pressure and protected against overload, including, a rigid, hollow case having a partition forming a part thereof and having a damping passage through it, a pair of seals mounted in said case, a sensing element having a stationary portion mounted in said case and a movable portion located in said case, said partition and said seals and said sensing element separating the interior of said case into chambers each adapted to contain a substantially incompressible liquid therein, valve seats formed on the opposite faces of said partition and surrounding the ends of said damping passage, a pair of overload valves cooperating with said valve seats and adapted to permit or to prevent flow of liquid through said damping passage, a guide tube associated with said overload valves for movement in said partition and extending in the direction of movement of said overload valves for a greater distance than the path of travel of said overload valves, a plate in a portion of the wall of said partition and forming part of the wall of said damping passage, and means connecting said sensing element to said overload valves to operate them.

References Cited in the file of this patent
UNITED STATES PATENTS

| | | |
|---|---|---|
| 2,747,614 | Gray | May 29, 1956 |
| 2,977,991 | Bauer | Apr. 4, 1961 |
| 3,047,022 | Aldinger | July 31, 1962 |
| 3,058,350 | Brown | Oct. 16, 1962 |
| 3,085,437 | Osterstrom | Apr. 16, 1963 |